United States Patent
Gendron

[15] 3,641,333
[45] Feb. 8, 1972

[54] ILLUMINATED BELT

[72] Inventor: Everett W. Gendron, 104 Andover Ct., Lemont, Ill. 60439

[22] Filed: Dec. 5, 1968

[21] Appl. No.: 781,381

[52] U.S. Cl..................240/6.4 W, 240/6.4 R, 240/10.5, 240/59
[51] Int. Cl.................................F21v 21/00
[58] Field of Search..............2/338; 240/6.4, 6.4 W, 6.46, 240/10.5, 52, 52.1, 52.15, 60, 59, 1, 1 EI, 10, 225; 224/24

[56] References Cited

UNITED STATES PATENTS

| 2,405,384 | 8/1946 | White | 240/6.4 W |
| 2,713,629 | 7/1955 | Etzkorn | 240/10 X |
| 1,155,377 | 10/1915 | Spalding | 240/59 |
| 1,662,668 | 3/1928 | Gossett | 240/59 |
| 2,721,257 | 10/1955 | Knox | 240/6.4 W X |
| 3,134,548 | 5/1964 | Medina et al. | 240/59 |

Primary Examiner—John M. Horan
Assistant Examiner—Alan Mathews
Attorney—Snow and Benno

[57] ABSTRACT

A flexible tubular belt of a generally translucent material adapted to carry an electromotive force power pack for connection to a plurality of light bulbs within the belt and the belt having a magnetic coupling which performs the dual function of holding the ends of the belt together and completing the electrical circuit to cause illumination of the bulbs within the belt.

8 Claims, 4 Drawing Figures

PATENTED FEB 8 1972 3,641,333
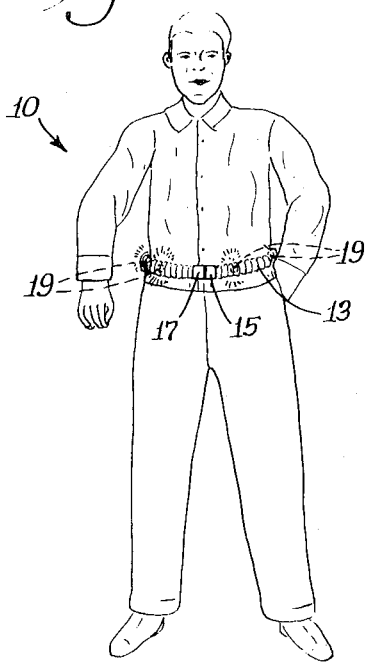
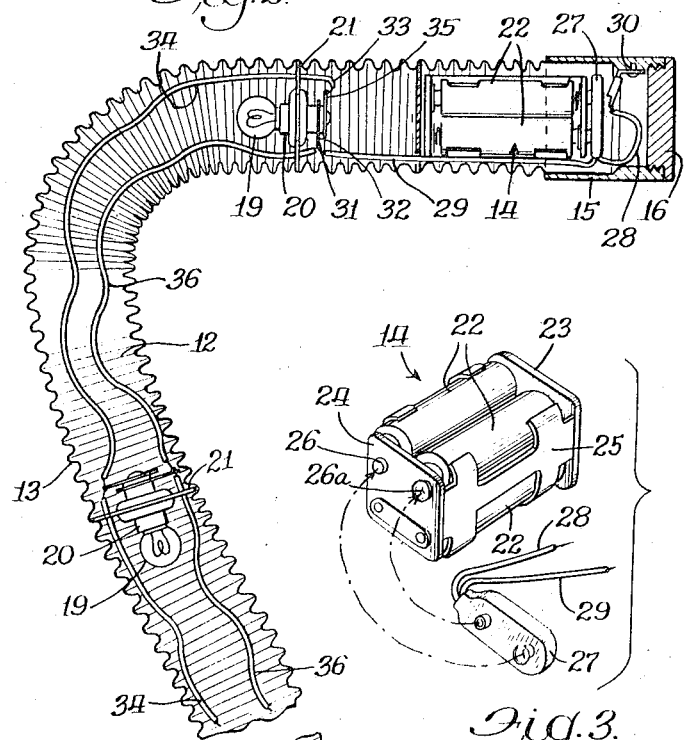
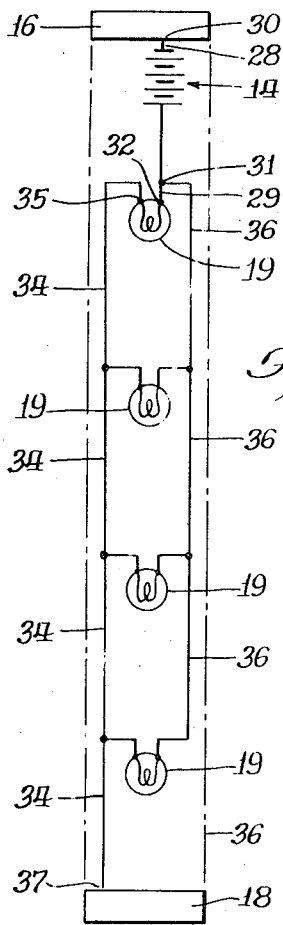
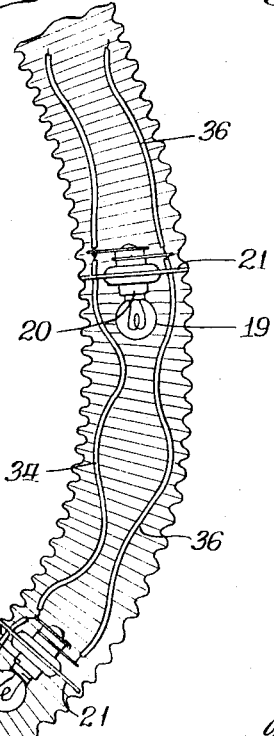
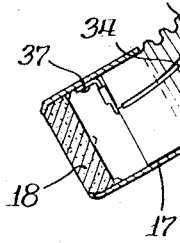
Inventor:
Everett W. Gendron
By Snow and Binno
Attys.

3,641,333

ILLUMINATED BELT

This invention relates to a new and improved illuminated belt.

An important object of this invention is to provide a novel illuminated belt to make the wearer visible in the dark.

Another important object of this invention is the provision of a novel flexible and extensible tubular belt with means for illuminating the belt throughout its length and with means for connecting the ends of the belt together.

Still another important object of this invention is to supply a novel flexible tubular belt with cooperative magnetic coupling elements in each end thereof whereby when the ends are brought in alignment and in close proximity the ends will be drawn together and held together making the belt an endless loop.

Another and further important object of this invention is to provide a novel belt as in the previous object and wherein there is included means for illuminating the belt throughout its length.

Still another important object of this invention is to provide a novel generally translucent accordion-type tubular belt with light means spaced at intervals along the length of the interior of the belt.

Another important object of this invention is to provide a novel belt as set forth in the preceding object with the inclusion of a powerpack within the belt to provide electromotive force for the spaced light means and further including a completion of the circuit by cooperative magnetic means fixed in each end of the tubular belt so that when the belt ends are drawn together the light means is illuminated.

Other and further important objects and advantages will become apparent from the disclosures in the following specification and accompanying drawings.

In the drawings:

FIG. 1 is a perspective view of a person wearing the illuminated belt of this invention.

FIG. 2 is a longitudinal sectional view of the illuminated belt of this invention.

FIG. 3 is a perspective view of the powerpack employed in the illuminated belt of this invention.

FIG. 4 shows a wiring diagram of the electrical circuit employed in the illuminated belt of this invention.

As shown in the drawings:

The reference numeral 10 indicates generally a person who may be a child or an adult who would have occasion to use the illuminated belt of this invention. The belt is designated generally by the numeral 11 and is shown encircling the waist of the wearer which may be a child when playing in the dark or an adult who desired to be seen in the dark. Adults would have occasion to wear the illuminated belt of this invention for visibility at night. The belt would be especially appropriate for policemen or other persons directing vehicle traffic.

As best shown in FIG. 2, the illuminated belt 11 comprises a translucent, accordion-type, flexible tubular plastic material 12 which forms the main body portion of the belt. The accordion plastic tubing has a limited amount of extensible and retractable characteristics so that one length of belt may be readily adaptable to persons having different sized waists. The accordion pleats are shown by individual corrugations 13 in the body of the belt 12.

The belt further includes a powerpack 14 which is disposed in one end of the tube 12. This powerpack is capable of producing an electromotive force and is the source of power for causing the illumination of the belt.

The belt 11 further includes a rigid sleeve member 15, preferably metal, which is affixed to the end of the tubular member 12 adjacent the powerpack 14. A magnetic element 16 is threadedly engaged into the outer end of the rigid sleeve 15. Access to the powerpack is gained by removal of the threadedly mounted magnetic end plug 16. Such access is required for replacement of or recharging of the batteries or other power source within the powerpack 14. The other end of the flexible tubular member 12 has affixed thereto a rigid sleeve member 17 which is also preferably made of metal. A cooperative magnetic end plug 18 is mounted in and held in the outer end of the rigid sleeve 17. The magnetic end plug element 16 and the cooperative magnetic end plug element 18 are of the type which will attract one another. Thus when the ends of the belt are drawn into proximate relationship with each other they are magnetically pulled together and held together causing the belt to form an endless loop. When this endless loop encircles the body of a person it simulates a belt.

The illuminated belt of this invention also comprises a plurality of light bulb means 19 which are spaced at intervals throughout the length of the interior of the flexible tubular member 12. All of the light bulbs have been assigned the same number for the reason that they perform the same function throughout the belt and act in exactly the same manner whether there would be one such bulb or many such bulbs. Each of the light bulbs is provided with a socket 20 which is held in a spacer member 21. The spacer members 21 act to hold the sockets in relatively fixed position within one annular corrugated groove 13 of the tube 12 to thus better maintain the spacing of the light bulbs 19 along the length of the belt.

The powerpack 14 includes a plurality of electrical batteries 22 which are held within a case comprising a base member 23, a spaced-apart generally parallel top member 24, and a side enclosure 25 which joins the base to the top and provides for the spring retention of the batteries within the powerpack 14. The top 24 of the case is provided with spaced-apart terminals 26 and 26a through which all of the electromotive force of the contained batteries within the pack pass. A connector element 27 is adapted to engage the snap on the terminals 26 and 26a. It is through this connector 27 that power from the pack is delivered to the plurality of light bulbs 19 positioned along the length of the belt 11.

Lead wires 28 and 29 extend from the connector 27. The lead wire 28 is connected at 30 to the inside of the rigid sleeve 15 and thus the sleeve and the magnetic plug 16 are joined by the lead wire 28 to the powerpack 14. The lead wire 29 is connected at 31 to a terminal 32 on the socket 20. A connection 33 joins an electrical wire 34 to a second terminal 35 on the socket 20. These connections are identical throughout the length of the belt at each of the electric light bulbs 19. A lead wire 36 forms part of the connection 30 on the terminal 32 and thus the wires 34 and 36 extend from one set of terminals to the next set of terminals on each light fixture throughout the belt. The other end of the lead wire 34 is fastened at 37 to the interior of the rigid metallic sleeve 17 and thus brings the connection from the powerpack 14 to the sleeve 17 and its included magnetic end plug 18. With this circuitry as shown in both of FIGS. 2 and FIGS. 4 and the details of the powerpack connections as shown in FIG. 3, the light bulbs 19 are illuminated upon the magnetic plugs 16 and 18 being coupled together. The connection of these magnets completes the electrical circuit to the bulbs and causes their illumination and thus the illumination of the translucent flexible belt throughout its length by reason of the spacing of the bulbs throughout the length of the flexible tubular member 12. It is thus apparent that the magnetic elements 16 and 18 form the dual function of holding the ends of the belt together as a coupling and simultaneously complete the electrical circuit within the belt and thus cause illumination of the light means within the belt. Conversely when the ends of the belt are separated it becomes uncoupled and the light means are extinguished.

I am aware that numerous details of construction may be varied throughout a wide range without departing from the principles disclosed herein and I therefore do not propose limiting the patent granted hereon otherwise than as necessitated by the appended claims.

What is claimed is:

1. A flexible, tubular, translucent belt including light means therein and means for joining the ends of said belt, said means for joining the ends of the belt including cooperative magnet elements.

2. A flexible, tubular, translucent belt including light means therein and means for joining the ends of said belt, said light means including a plurality of spaced-apart light bulbs, a powerpack of electromotive force, wiring joining said powerpack with said bulbs, and said means for joining the ends of the belt including cooperative magnet elements which are further included in the wiring whereby when the magnet elements are brought together an electrical circuit is completed to cause illumination of the light bulbs.

3. A flexible, tubular, translucent belt including light means therein and means for joining the ends of said belt, said flexible, tubular, translucent belt including a plastic accordion-type tube, a rigid sleeve on each end of said tube, said means for joining the ends of said belt including cooperative magnet elements, and one of said cooperative magnet elements carried by each of said sleeves.

4. A belt as set forth in claim 3 in which one of said magnet elements is removably fastened to said sleeve for access to the interior of the belt.

5. A belt as set forth in claim 4 in which said light means includes a powerpack located adjacent the removable magnet element, and further a plurality of light bulbs strung through the belt and energized by the powerpack.

6. A belt as set forth in claim 5 in which the joining of the magnet elements causes a completion of the circuit from the powerpack to the light bulbs.

7. A flexible, continuously tubular, translucent belt including light means within the tubular belt for providing illumination of the continuously tubular translucent belt from within, means for joining the ends of said belt, said light means including a plurality of spaced-apart light bulbs, sockets for said light bulbs and a spacer for each socket, a powerpack of electromotive force, wiring joining said powerpack with said sockets, said flexible, continuously tubular, translucent belt including a plastic accordion-type tube, and each of said socket spacers adapted to be held in one annular corrugated groove of the accordion tube.

8. A belt as set forth in claim 7 in which there is included a rigid sleeve on each end of said flexible, continuously tubular, translucent belt.

* * * * *